Feb. 10, 1925.
B. B. LORENZ
1,525,615
RESILIENT WHEEL
Filed Nov. 8, 1923
3 Sheets-Sheet 1

Inventor
Byron B. Lorenz
By Lancaster and A. Meurin
Attorneys

Feb. 10, 1925.

B. B. LORENZ

RESILIENT WHEEL

Filed Nov. 8, 1923  3 Sheets-Sheet 2

1,525,615

Inventor
Byron B. Lorenz
By Lancaster and Allwine
Attorneys

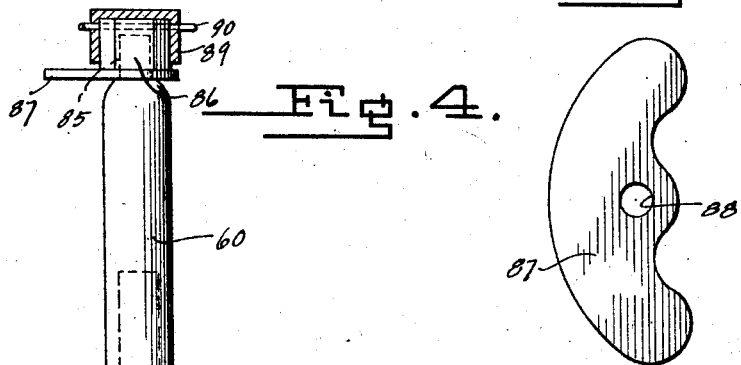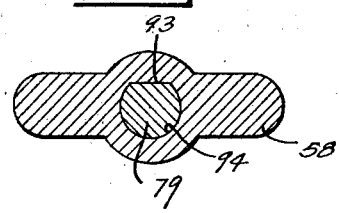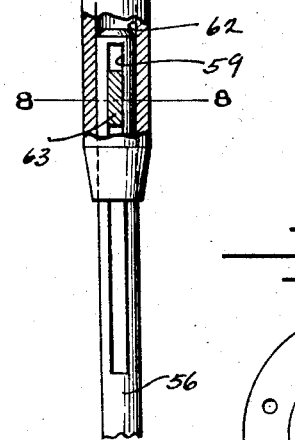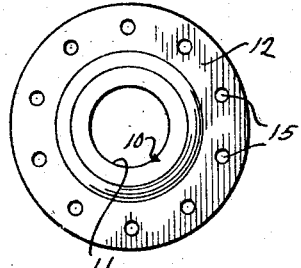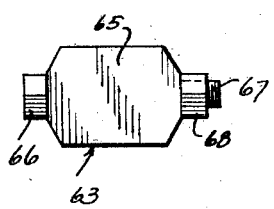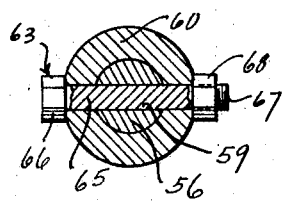

Patented Feb. 10, 1925.

1,525,615

UNITED STATES PATENT OFFICE.

BYRON BABCOCK LORENZ, OF FREDERICKTOWN, MISSOURI.

RESILIENT WHEEL.

Application filed November 8, 1923. Serial No. 673,568.

*To all whom it may concern:*

Be it known that I, BYRON B. LORENZ, a citizen of the United States, residing at Fredericktown, in the county of Madison and State of Missouri, have invented certain new and useful Improvements in a Resilient Wheel, of which the following is a specification.

This invention relates to improvements in resilient wheels.

The primary object of this invention is the provision of a resilient wheel which embodies novel features rendering the same practical and very durable, in that the springs which provide the resiliency therefor may be placed under a compression, incident to the load of the vehicle, both above and below the axis of the wheel support.

A further object of this invention is the provision of a novel type of vehicle wheel embodying certain features which are set forth in my Patent #1,454,122, granted May 8, 1923, and including advantages thereover in that the spring arrangement is of a more flexible and durable character.

Other objects and advantages of this invention will be apparent during the course of the following detailed description.

In the accompanying drawings, forming a part of this specification, and wherein similar reference characters designate corresponding parts throughout the several views, Figure 1 is a side elevation of the improved vehicle wheel, showing the novel structural details thereof, and especially the novel spring and its supporting mechanism.

Figure 4 is an enlarged view, partly in cross section, showing novel features of the spring supporting and compressing means.

Figure 5 is a plan view of a spring engaging detail of this invention.

Figure 6 is a cross sectional view taken substantially on the line 6—6 of Figure 3.

Figure 7 is an end elevation of the hub casing of the resilient wheel.

Figure 8 is a cross sectional view taken substantially on the line 8—8 of Figure 4.

Figure 9 is a side elevation of the bolt which is illustrated in Figure 8.

Figure 1:
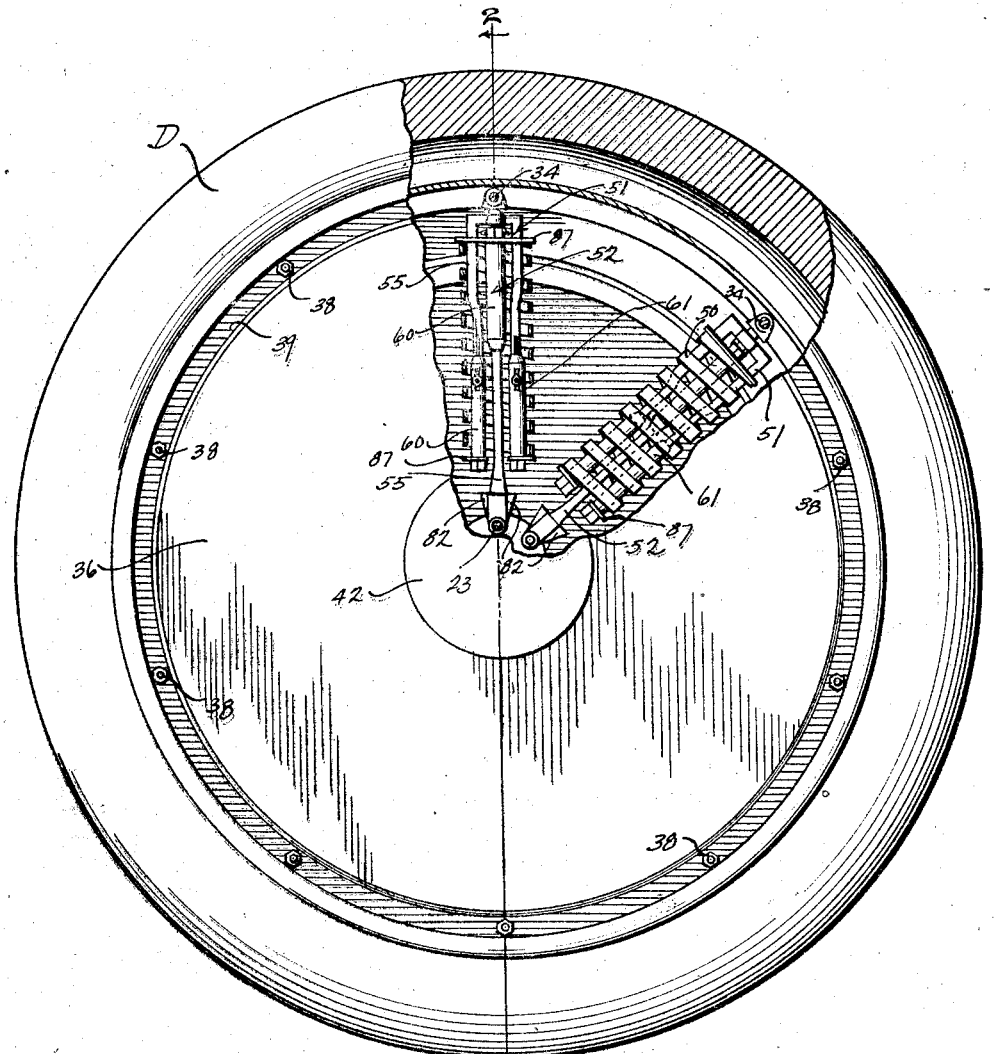

In the drawings, wherein for the purpose of illustration is shown but the preferred embodiment of the improved resilient wheel, the letter A may generally designate the resilient wheel, which may include a hub structure B; felly structure C; tire D; and the novel means E for resiliently supporting the hub structure B upon the felly construction C and the tire D.

The hub structure B may include a hub casing 10, provided with a tapered opening 11 therethrough into which the spindle of an axle may extend. This hub casing 10 is preferably provided with the circumferential attaching flanges 12 and 13 at the outer and inner ends respectively thereof; said flanges 12 and 13 having aligning openings 15 therein. Plates 20 and 21, which are rigidly connected to the hub casing 10 by means of transverse bolts 23 which extend through the aligning openings 15 of the hub casing flanges 12 and 13 may be considered a part of the hub structure, as they extend rigidly outwardly therefrom at the outer and inner sides respectively of the vehicle wheel. The bolts 23 may also be utilized for connection of a brake drum 26 at the inside of the wheel, and to the outer side of the plate 21, in a sufficiently spaced relation therewith to permit of action of the felly structure plates as will be subsequently described. It is preferred that the nut portions 24 of the bolts 23 be at the outer side of the wheel, in engagement with the plate 20; suitable sockets being provided in the plate 20 for the reception thereof; the outer annular portion 29 of the plate 20 thus lying in a plane which is disposed outwardly from the plane in which the nuts 24 lie, for a purpose which will be subsequently set forth.

Referring to the felly construction C, the same preferably includes a felly ring or casing 30, which at opposite sides thereof has the outwardly extending tire retaining flanges 31 thereon, and on the inside circumference thereof has the spaced flanges 32 and 33 at the inner and outer edges thereof, provided with suitable openings therein adapted to receive transversely extending bolts 34 therethrough. Outer and inner side plates 36 and 37 respectively are preferably provided for attachment to the flanges 32 and 33 by means of the bolts 34. The bolts 34 preferably have the detachable nut portions 38 thereof at the outside of the vehicle wheel A, and fitting in the annular groove 39 provided at the outer margin of the side plate 36, so that said nut structures 38 lie inwardly of the plane of the main portion of the plate 36, and inwardly of the side of the tire D, to prevent mutilation incident to driving over rough roads, and to prevent the bolts from being an impediment to travel. The outer side plate 36 centrally thereof is provided with the annular outwardly extending screw threaded flange 40 adapted to detachably receive thereover the hub cap 42.

When the hub structure B is properly assembled with respect to the felly structure C, the side plates 20 and 21 are in respective sliding contact with the inner surfaces of the side plates 36 and 37. The plates 20 and 36, of course, overlap, as do also the plates 21 and 37. It is preferred that the plates 21 and 37 be respectively provided at the outer margins thereof with suitable U-shaped channel portions 44 providing annular grooves adapted to receive packing 45; the packing being in contact with the facing sliding plates, to provide a non-leak jointed connection of the overlapping plates 21 and 37. It is thus apparent from this description of the plate constructions between the hub and felly parts that a compartment is provided of a leak-proof character, and which normally is adapted to carry a supply of oil within which operates the felly supporting structures E.

Any number of the spring arrangements E may be provided within the compartment of the vehicle wheel A, consistent with the size thereof; these structures E extending in radial relation from the hub casing 10 to the felly or rim portion 30. Each of the spring supporting devices E includes the spiral compression spring 50 and substantially U-shaped connecting devices 51 and 52 which are respectively connected to the felly and hub bolts 34 and 23 of the resilient wheel, and extend in planes at right angles to each other through the spring 50 for connection to the spring at its free ends.

The devices 51 and 52 are similarly formed, each including a rigid U-shaped body portion 55 which provides the outstanding legs 56 and 57 and the bight portion 58 which connects said legs. The legs 56 and 57 at their free ends are transversely slotted, as at 59, although not entirely slotted to their free ends, as can readily be seen in Figure 4 of the drawings. Sleeves 60 and 61, of similar formation, are slidably disposed respectively on the legs 56 and 57 in a telescopic relation therewith, providing passageways 62 therein into which the legs 56 and 57 slidably extend. Bolts 63 of novel formation connect the sleeves 60 and 61 upon the legs 56 and 57 in a positive manner. Each of the bolts 63, as shown in Fig. 9, preferably includes a flat body portion 65 of polygonal outline which extends through a suitable opening in the inner end of each of the sleeves 60 or 61 for slidable positioning in the slot 59 of the U-shaped body 55. A head 66 is provided on each bolt 63 which lies at one side of the sleeve 60 or 61 and a screw threaded shank 67 detachably carries a nut 68 which may engage the opposite side of the sleeve to maintain the bolt 63 in position so that the sleeve is slidably connected in a positive and nondetachable manner with respect to a leg of the body 55.

Figure 2:
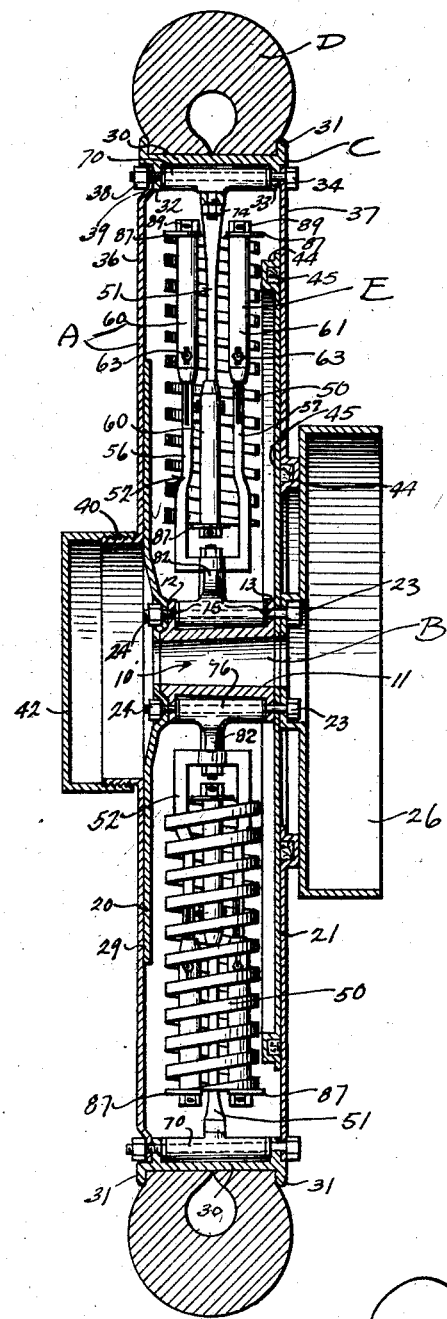
Figure 2 is a cross sectional view taken diametrically through the improved vehicle wheel.
Figure 3:
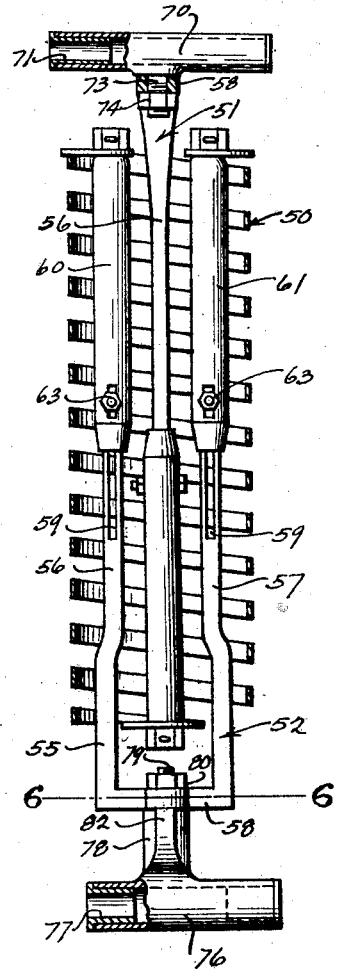
Figure 3 is an enlarged view showing details of the improved type of spring and supporting means embodied in the resilient wheel.

Referring to the manner of connecting the U-shaped devices 51 and 52, sleeves 70 are provided for each of the felly bolts 34, which are open at their ends, and in which ends suitable bushings 71 are disposed, of any approved material, such as babbitt. These sleeves 70 and the bushings 71 therein receive the bolts 34 therethrough to hingedly support the sleeves 70 between the felly flanges 32 and 33, substantially as is illustrated in Figure 2 of the drawings. Each sleeve 70 radially provides a screw threaded shank 73 which extends outwardly from the felly rim 30 and is adapted to receive the bight portion 58 of each U-shaped device 51; a nut 74 being provided to retain the device 51 on the shank 73 so that the device 51 extends radially inwardly toward the hub of the wheel A. It is preferred that the plane of the device 51 be disposed in parallelism with the plane of the vehicle wheel. On the other hand, sleeves 76 are provided for the hub bolts 23, which in the the ends thereof, are provided with bushings 77 for the oscillative support of the sleeves 76 upon the hub bolts 23 between the flanges 12 and 13 of the hub casing 10. The sleeves 76 preferably provide a radial extension 78 which projects towards the felly of the wheel and which at its end provides a screw threaded shank 79 for receiving thereover the bight portion 58 of a device 52; the latter being retained on the screw threaded shank 79 as by a nut 80. Each radial extension 78 also has the laterally extending stop lugs 82 at each side thereof, against which the free ends of the device 51 may abut under certain compression force of the spring, as will be subsequently described.

At the outer end of each sleeve 60 and 61 of the devices 51 and 52 a screw threaded shank 85 is provided, adapted to receive a polygonal shaped nut 86 whereby to clamp a substantially crescent shaped spring contacting flange 87 at the outer end of each sleeve; the attaching plate or flange 87 having a suitable opening 88 for receiving the screw threaded shank 85 therethrough. Suitable protecting casings 89 may be disposed over the nuts 86 and connected thereto by means of cotter pins 90; the protecting casings 89 being provided to prevent mutilation of the nuts 86 incident to the battering of the same against the hinged sleeves 70 in the case of the U-shaped device 52, and the stop lugs 82 in the case of the device 51. As before mentioned the U-shaped device 51 is connected at the felly portion of the wheel A and extends through the spring 50, and at its free end is connected to the spring 50 by means of the laterally extending attaching plates or flanges 87 which engage over the end of the spring 50 and clamp the spring in a definite relation to the device 51 at the free end of said device 51. Similarly, the devices 52 which are oscillatively pivoted at the hub of the wheel A extend outwardly through the springs 50, and it is to be noted that the plane defined by each U-shaped device 52 is at right angles to the plane defined by the vehicle wheel A and is in inverted right angled relation with respect to the device 51 disposed through the same spring. At their free ends the sleeves 60 and 61 of the device 52 are connected to the outer end of the spring 50 through which they are disposed, by means of the attaching plates or flanges 87 which are carried by the device 52. It is thus to be noted that each spring 50 is placed in a compressed relation between the attaching plates or flanges 87 at the outer ends of the devices 51 and 52. This compression of the springs 50 is sufficient to maintain the felly structure of the vehicle wheel A in a concentric relation with the axis of the wheel when there is no weight upon the wheel, and as can readily be understood. In order that there will be no liability of shifting of the devices 51 and 52 out of their right angled relation and their position with respect to the frame of the vehicle wheel A, it is preferred that the shanks 73 and 79 of the sleeve structures 70 and 76 which support the frames 55 of the devices 51 and 52, be provided with a flat side 93, which is illustrated in Figure 6 of the drawings, the openings 94 which are provided through the bight portions 58 of the U-shaped body portions 55 being formed similar to the screw threaded shanks to prevent any possibility of lateral movement of the U-shaped devices 51 and 52 out of the relation which they are supposed to assume. This relation of parts is illustrated in the cross sectional view in Figure 6 of the drawings.

It is of course to be understood that any number of the devices E may be flared in radial relation between the hub and felly structure of the resilient wheel A, consistent with the size of the vehicle wheel and the load which the same is to support. The compartment of the vehicle wheel A between the side plates and in which the spring supporting devices E are positioned is filled with oil, so that the operation of the wheel is very flexible and noiseless. In the actual operation of the vehicle wheel, incident to normal loads, it can readily be understood that the springs 50 of those devices E which are positioned uppermost in the vehicle wheel A will receive the direct compression as the hub casing 10 moves away from the upper portion of the felly. The fact that the devices 51 and 52 are oscillatively connected by the novel sleeves to the felly and hub bolts provides a very satisfactory arrangement with the proper flexing of the compression devices E which are located laterally of the axis of the vehicle wheel as well as those in horizontal position, so that they may take up some of the load. A very novel feature of this invention is the fact that the devices E will permit the springs 50 below the axis of the wheel to compress to take some of the weight of an excessive load, as well as the taking up of this load by compression of the springs above the axis of the wheel. The fact that the springs 50 below the vehicle wheel axis may compress is permitted because of the telescopic nature of the devices 51 and 52. Under an abnormal load the devices E below the axis of the wheel will operate as follows:—The hub connected part 52 will, of course, move downwardly until the protecting casings 89 at the ends of the sleeves 60 and 61 thereof contact the sleeves 70, and any further movement of the hub structure downwardly toward the ground surface will cause the legs 56 and 57 of the device 52 to slide into the sleeves 60 and 61. In a similar manner the device 51 of each structure E which is located below the axis of the wheel may have the sleeves 60 and 61 thereof telescoped over the legs 56 and 57 incident to contact of the protecting casings 89 thereof against the laterally extending stop lugs 82. It is thus apparent that the sleeve portions of the parts 51 and 52 will permit the legs of the U-shaped portions 55 to slide thereinto to permit the compressing of the springs 50 between the upper and lower attaching plates 87 which contact the same, so that the devices E which are below the axis of the vehicle wheel, incident to an abnormal load will be compressed to take some of the weight of the load. It is also apparent that the devices E above the vehicle wheel axis are operated in normal manner and are compressed to take the primary share of the load.

Various changes in the shape, size, and arrangement of parts may be made to the form of invention herein shown and described, without departing from the spirit of this invention or the scope of the claims.

I claim:

1. As an article of manufacture a compression member for vehicle wheels comprising telescopic members, a spring receiving the telescopic members therethrough, means connecting one of the telescopic members to one end of the spring, and means connecting the other telescopic member to the other end of said spring.

2. In a vehicle wheel the combination of a hub structure, a felly structure, a spring, a telescopic member connected at one end to the felly structure and at its other end connected to the spring, and a telescopic member connected at one end to the hub structure and at its other end to the spring at a point remote from the connection of the first mentioned telescopic member with said spring.

3. As an article of manufacture a spring supporting device for vehicle wheels comprising a felly connected member including a portion for direct connection to the felly and a portion slidable on said first mentioned portion, a hub connected member including a portion for direct connection to a hub and a portion slidable on said last mentioned portion, a spring having the felly connected member and hub connected member extending therethrough, and means for connecting the slidable portions of said connected members to opposite ends of said spring.

4. In a vehicle wheel structure the combination of a hub arrangement, a felly arrangement, a spiral compression spring, a collapsible device oscillatively connected to the hub arrangement and extending through said spring for connection to the end of said spring remote from the hub arrangement, and a collapsible device oscillatively connected to the felly arrangement and extending through said spring for connection to the end of said spring remote from the felly arrangement connected end.

5. In a vehicle wheel construction the combination of a felly ring having transverse bolts connected thereto, a hub casing having transverse bolts connected thereto, sleeves oscillatively carried by the transverse bolts of said felly and hub, U-shaped members fixedly connected to the sleeves on said bolts, sleeves slidable on the ends of said U-shaped members, a compression spring, means connecting the sleeves of one of said U-shaped members to one end of said spring and the sleeves of the other U-shaped member to the opposite end of said spring whereby upon movement of the hub casing away from a portion of the felly ring said spring will be placed under compression, and stops for said slidable sleeves, whereby upon movement of the hub casing toward a portion of the felly ring said springs will also be placed under compression.

6. In a vehicle wheel the combination of hub and felly structures, bolts carried by said hub and felly structures, sleeves oscillatively carried on the bolts of said hub and felly structures, members radially extending outwardly from said sleeves in a fixed relation therewith, a spring receiving said members therethrough, and means connecting said members to opposite ends of said spring.

7. In a vehicle wheel structure the combination of a hub and felly structures, devices connected to said hub and felly structures each including a part slidable thereon, a spring, and means connecting the slidable parts of said devices to opposite ends of said spring, said spring adapted to be placed under compression when the hub moves away from the felly, said sliding parts of the devices when the hub moves toward the felly adapted to contact parts of the vehicle wheel to permit collapsing of said devices to compress the spring for supporting a load upon the vehicle wheel.

8. In a vehicle wheel spring supporting device the combination of a pair of U-shaped frames including leg portions provided with transverse slots therein, sleeves slidable on the legs of said U-shaped frames, bolt means connecting said sleeves thru the slots of the legs of said frames to permit sliding of said sleeves thereon for a limited amplitude of movement, a spring, and means for connecting the outer ends of the sleeves of one of the U-shaped frames to one end of the spring and the sleeves of the other U-shaped frame to the opposite end of said spring.

9. A vehicle wheel construction comprising a hub casing, a felly rim, plates carried in spaced relation at the sides of the felly rim and hub casing to provide a compartment in the vehicle wheel, the plates of the hub casing being disposed in overlapping relation with the plates of the felly rim, U-shaped frames carried in oscillative relation by the hub casing and the felly rim and extending radially of the vehicle wheel, sleeves slidably supported on the end portions of said U-shaped frames, spiral springs receiving the end portions of the U-shaped frames therethrough, and means connecting the sleeve portions of the frames, which are connected to the hub casing, to the outer end of the spring and the sleeves of the U-shaped frames, which are connected with the felly rim, with the inner end of said springs.

BYRON BABCOCK LORENZ.